US012448407B2

(12) United States Patent
Serizawa et al.

(10) Patent No.: US 12,448,407 B2
(45) Date of Patent: Oct. 21, 2025

(54) MEDIUM ADDITIVE FOR SUSPENSION CULTURE, MEDIUM COMPOSITION AND CULTURE METHOD

(71) Applicants: DKS CO. LTD., Kyoto (JP); TOKYO INSTITUTE OF TECHNOLOGY, Tokyo (JP)

(72) Inventors: Takeshi Serizawa, Tokyo (JP); Toshiki Sawada, Tokyo (JP); Masahito Nishiura, Kyoto (JP); Rina Murase, Kyoto (JP)

(73) Assignees: DKS CO. LTD., Kyoto (JP); TOKYO INSTITUTE OF TECHNOLOGY, Tokyo (JP)

( * ) Notice: Subject to any disclaimer, the term of this patent is extended or adjusted under 35 U.S.C. 154(b) by 850 days.

(21) Appl. No.: 17/765,784

(22) PCT Filed: Oct. 23, 2020

(86) PCT No.: PCT/JP2020/039831
§ 371 (c)(1),
(2) Date: Mar. 31, 2022

(87) PCT Pub. No.: WO2021/085317
PCT Pub. Date: May 6, 2021

(65) Prior Publication Data
US 2022/0389045 A1 Dec. 8, 2022

(30) Foreign Application Priority Data
Oct. 31, 2019 (JP) ................................. 2019-199228

(51) Int. Cl.
*C07H 3/06* (2006.01)
*C08B 15/08* (2006.01)
*C12N 1/22* (2006.01)
*C12N 5/00* (2006.01)

(52) U.S. Cl.
CPC ............... *C07H 3/06* (2013.01); *C08B 15/08* (2013.01); *C12N 1/22* (2013.01); *C12N 5/0018* (2013.01); *C12N 2533/78* (2013.01)

(58) Field of Classification Search
None
See application file for complete search history.

(56) References Cited

U.S. PATENT DOCUMENTS

| | | | | |
|---|---|---|---|---|
| 2009/0041736 A1* | 2/2009 | Sprenger | ................ | A61K 47/26 424/93.4 |
| 2010/0159546 A1* | 6/2010 | Aristidou | .................. | C12P 7/16 435/254.2 |
| 2017/0009201 A1 | 1/2017 | Hayashi et al. | | |
| 2020/0165621 A1* | 5/2020 | Chomvong | ............. | C12P 19/02 |

FOREIGN PATENT DOCUMENTS

| | | |
|---|---|---|
| JP | 2018-145216 A | 9/2018 |
| JP | 2018-174871 A | 11/2018 |
| WO | WO 2009/111021 A1 | 9/2009 |
| WO | WO 2015/111686 A1 | 7/2015 |
| WO | WO 2016/113933 A1 | 7/2016 |
| WO | WO 2016/140369 A1 | 9/2016 |

OTHER PUBLICATIONS

Greene, R. V., & Freer, S. N. (1986). Growth characteristics of a novel nitrogen-fixing cellulolytic bacterium. Applied and environmental microbiology, 52(5), 982-986. (Year: 1986).*
Extended European Search Report for European Application No. 20880549.9, dated Oct. 6, 2023.
"Polymer Preprints", 2018, vol. 67, No. 2, 1T12, total of 3 pages.
"Preprints of the conference of Japanese Society for Biomaterials", 2018, vol. 40, p. 312, 1P-057.
International Preliminary Examination Report for PCT/JP2020/039831 (PCT/IPEA/408) mailed on Nov. 16, 2021.
International Search Report for PCT/JP2020/039831 (PCT/ISA/210) mailed on Dec. 28, 2020.
Nohara et al., "Enzymatic synthesis and protein adsorption properties of crystalline nanoribbons composed of cellulose oligomer derivatives with primary amino groups", Journal of Biomaterials Science, Polymer Edition, 2017, vol. 28, pp. 925-938, 3.4.
Serizawa et al., "Neutralization-Induced Self-Assembly of Cellulose Oligomers into Antibiofouling Crystalline Nanoribbon Networks in Complex Mixtures" ACS Macro Lett., 2020, vol. 9, pp. 301-305.
Written Opinion of the International Searching Authority for PCT/JP2020/039831 (PCT/ISA/237) mailed on Dec. 28, 2020.

* cited by examiner

*Primary Examiner* — Dale R Miller
(74) *Attorney, Agent, or Firm* — Birch, Stewart, Kolasch & Birch, LLP

(57) ABSTRACT

To culture cells in a suspended state and easily recover the cultured cells. An additive for suspension culture according to an embodiment is a medium additive which is added to a medium for culturing cells in suspension, the medium additive containing a cellulose oligomer. A medium composition according to an embodiment is a medium composition capable of culturing cells in suspension, the medium composition containing a cellulose oligomer. A cell culture method according to an embodiment includes culturing cells in the medium composition.

13 Claims, 7 Drawing Sheets

After 1 d culture (in culture solution)

After 5 d culture

(A)

(B)

Fixation of observation site (A) 
Before culture (B) 
After culture

Spheroid after recovery (A) 
(B)

MEDIUM ADDITIVE FOR SUSPENSION CULTURE, MEDIUM COMPOSITION AND CULTURE METHOD

TECHNICAL FIELD

The present invention relates to a medium additive for suspension culture used for culturing cells in suspension, a medium composition capable of culturing cells in suspension, and a culture method using the same.

BACKGROUND ART

Three-dimensional cell culture is known as a technique for culturing cells while allowing the cells to three-dimensionally interact with the surrounding environment. In the three-dimensional cell culture, for example, when cells are cultured in a liquid medium, the cells settle and aggregate. As a technique for preventing aggregation of cells, there are a technique using a hydrogel and a technique of suspending cells by stirring with a spinner.

However, in the technique using a hydrogel, the growth of cells incorporated into a gel matrix is hindered by the pressure of the gel, and a cell aggregate is likely to become uneven in size due to the non-uniform gel structure. Further, problematically, it is difficult to separate the gel and the cells from each other. On the other hand, in stirring culture in which stirring is performed with a spinner, there is a concern that the stirring is performed at all times, leading to damage to the cells.

PTL 1 discloses a suspension culture method in which cells are cultured by adding nanofibers such as cellulose and chitin to a liquid medium, as a technique capable of culturing cells in suspension without stirring with a spinner. However, the nanofibers of cellulose disclosed in PTL 1 are polymeric compounds obtained by finely dividing (pulverizing) cellulose with a high-pressure homogenizer or the like, and an aqueous dispersion thereof generally has a high viscosity, and thus it is difficult to recover cultured cells.

CITATION LIST

Patent Literature

[PTL 1] WO 2015/111686 A

SUMMARY OF INVENTION

Technical Problem

An object of an embodiment of the present invention is to provide a medium additive for suspension culture, a medium composition, and a culture method capable of culturing cells in a suspended state and easily recovering the cultured cells.

Solution to Problem

The medium additive for suspension culture according to an embodiment of the present invention is a medium additive for suspension culture which is added to a medium for culturing cells in suspension, the medium additive containing a cellulose oligomer.

The medium composition according to an embodiment of the present invention is a medium composition capable of culturing cells in suspension, the medium composition containing a cellulose oligomer.

In the present invention, the cellulose oligomer may have no substituent or may have a substituent.

The cell culture method according to an embodiment of the present invention includes culturing cells in the medium composition.

Advantageous Effects of Invention

According to embodiments of the present invention, cells can be cultured in a suspended state by blending the cellulose oligomer in the medium. In addition, since the medium is maintained at a low viscosity even when the cellulose oligomer is added, the cells can be easily recovered by, for example, filtration.

DESCRIPTION OF EMBODIMENTS

1. Medium Additive for Suspension Culture

Figure 1:
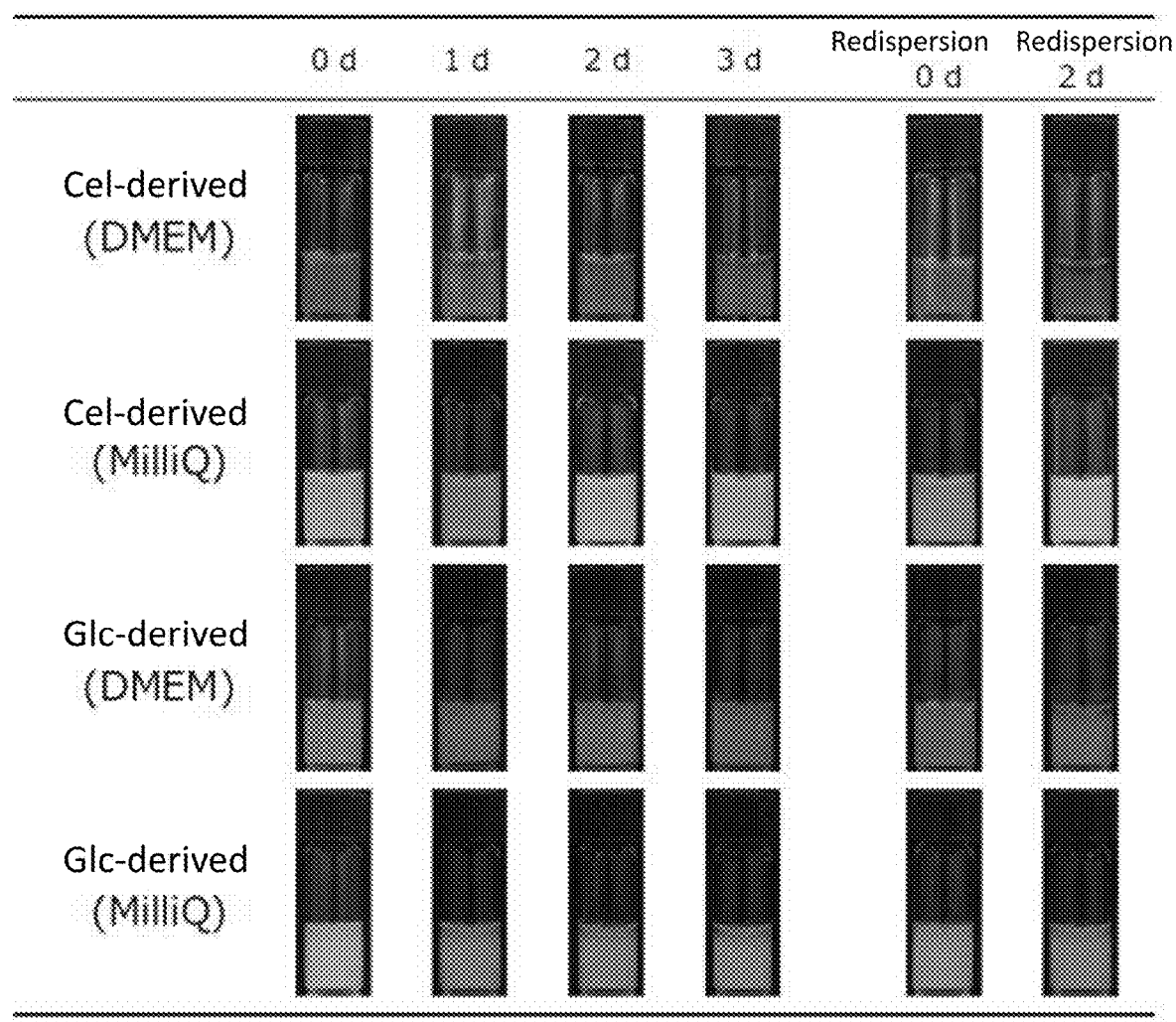
FIG. 1 Photographs of dispersions showing evaluation results of dispersion stability of cellulose oligomers in ultrapure water and DMEM.

A medium additive for suspension culture according to a present embodiment (hereinafter, sometimes referred to simply as medium additive) contains a cellulose oligomer. The cellulose oligomer is water-insoluble and has excellent dispersion stability in water, and thus has an effect of retaining cells in a suspended state in a liquid medium. Therefore, it can be used as an additive for culturing cells in suspension.

(A) Cellulose Oligomer

The cellulose oligomer is an oligosaccharide having a structure in which glucoses are linked by a $\beta$-1,4 glycosidic bond, and is also referred to as a cellooligosaccharide. The cellulose oligomer may have no substituent, or may have, for example, a substituent such as an alkyl group at the anomeric position of the reducing terminal.

The cellulose oligomer preferably has an average polymerization degree (DP) (average value for the number of glucose units present in one molecule) of 5 to 20. The average polymerization degree (DP) is preferably 6 or more, and also preferably 15 or less, more preferably 12 or less, and may be 10 or less. The cellulose oligomer is usually a mixture of compounds having different polymerization degrees, and may contain, for example, a compound having a polymerization degree of 4 to 20, a compound having a polymerization degree of 5 to 18, or a compound having a polymerization degree of 5 to 13.

As the cellulose oligomer, it is preferable to use a compound represented by the following general formula (1).

[Chem. 1]

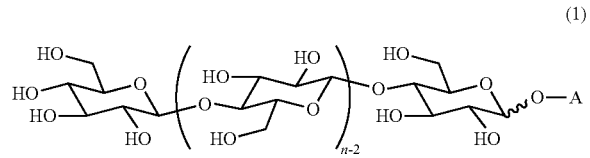

(1)

In the formula, A represents a hydrogen atom or a substituent. The substituent is a group introduced instead of a hydrogen atom, and examples thereof include an alkyl group having 1 to 12 carbon atom(s), and the substituent may be an alkyl group having 1 to 5 carbon atom(s). The wavy line in the bond between the carbon atom at the 1-position of the reducing terminal and the O-A group indicates that the O-A group may be of α type or β type. n represents an average polymerization degree, and is preferably 5 to 20. n is preferably 6 or more, and also preferably 15 or less, more preferably 12 or less, and may be 10 or less.

A method for synthesizing the cellulose oligomer is not particularly limited. Examples of the method include a method in which α-glucose-1-phosphate (hereinafter, sometimes referred to as αG1P) and at least one primer selected from the group consisting of glucose, cellobiose, and derivatives thereof are reacted with cellodextrin phosphorylase (hereinafter, sometimes referred to as CDP). This reaction is a synthesis method using a reverse reaction of CDP, and αG1P as a glucose donor and at least one selected from the group consisting of glucose, cellobiose, and derivatives thereof as a primer (that is, a glucose receptor) are reacted with CDP, so that αG1P is sequentially polymerized, as a monomer, with respect to the primer.

For example, the reaction when the primer is glucose is as follows.

[Chem. 2]

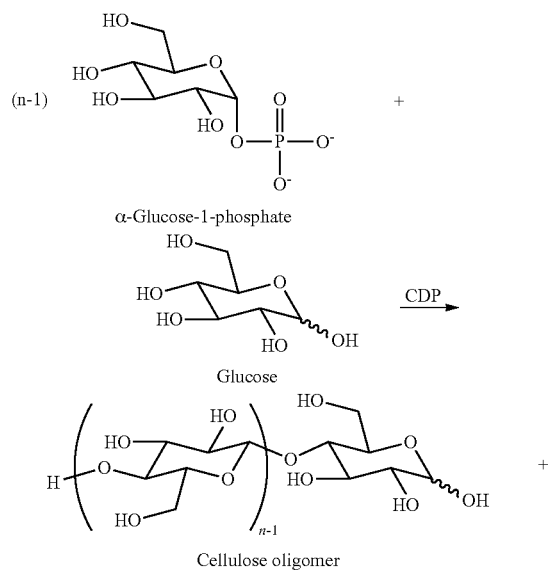

For example, the reaction when the primer is cellobiose is as follows.

[Chem. 3]

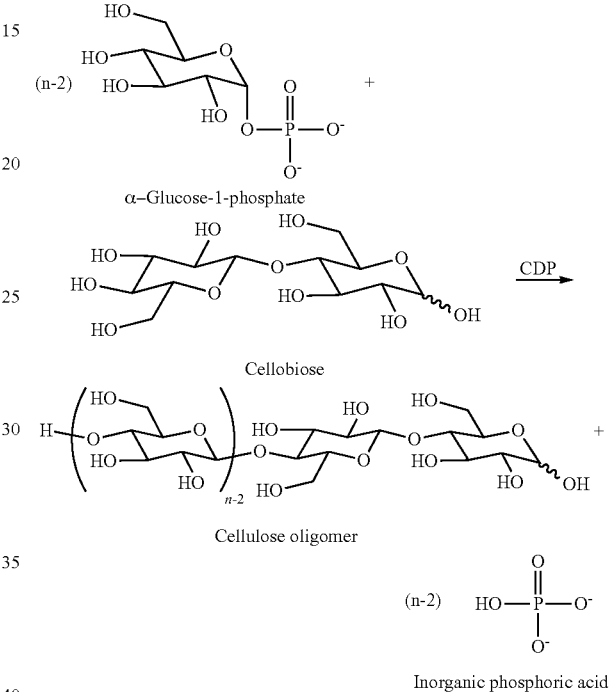

By replacing the hydrogen atom of the hydroxy group at the anomeric position in the primer with a substituent such as an alkyl group, cellulose oligomers of Formula (1) having various substituents can be synthesized.

CDP is known to be produced by microorganisms such as *Clostridium thermocellum* and the genus *Cellulomonas*, and can be obtained by a known method using these microorganisms. For example, CDP derived from *Clostridium thermocellum* YM4 can be prepared by an *E. coli* expression system according to the method described in M. Krishnareddy et al., J. Appl. Glycosci., 2002, 49, 1-8, but CDP to be used is not limited thereto.

A concentration of CDP is not particularly limited, and may be, for example, 0.1 U/ml or more or 0.2 U/ml or more. Here, an amount of enzyme of CDP can be determined, for example, on the basis of enzyme activity. In this case, for example, αG1P and D-(+)-cellobiose, and CDP are incubated, the phosphoric acid produced by CDP is quantified, and the amount of enzyme liberating 1 μmol of phosphoric acid per minute can be set to 1 U.

For example, 10 to 1000 mM αG1P, 10 to 200 mM primer (glucose, cellobiose, and derivatives thereof), and 0.1 U/mL or more of CDP are mixed in 100 to 1000 mM 2-[4-(2-hydroxyethyl)-1-piperazinyl]ethanesulfonic acid (HEPES) buffer solution (pH 7.0 to 8.0), incubated at 10 to 80° C. for 30 minutes to 30 days, and reacted, whereby a cellulose oligomer of Formula (1) can be synthesized.

The thus-synthesized cellulose oligomer has a cellulose II crystal structure. In contrast to a naturally-derived cellulose I crystal structure in which cellulose chains are arranged in parallel, an artificially synthesized cellulose oligomer forms a thermodynamically stable cellulose II crystal structure.

As the cellulose oligomer, a cellulose oligomer synthesized using CDP as described above may be used as it is, or a self-assembled cellulose oligomer may be used. The self-assembled cellulose oligomer can be prepared as follows. Specifically, an aqueous solution in which a cellulose oligomer is dissolved in an alkaline aqueous solution is prepared, and the obtained aqueous solution is made neutral or acidic using an acid. As a result, the cellulose oligomer becomes insoluble and is precipitated, but, at that time, the cellulose oligomer is self-assembled by incubation with stirring, vibration, or the like or in a state of being allowed to stand. That is, molecules of the cellulose oligomer are aligned to form a cellulose structure having a cellulose II crystal structure.

(B) Medium Additive

A medium additive may be an aqueous dispersion of a cellulose oligomer. That is, the medium additive preferably contains water together with the cellulose oligomer such that the cellulose oligomer is dispersed in the water. When the medium additive is an aqueous dispersion, the cellulose oligomer can be easily dispersed in a liquid medium. The medium additive may be composed only of the cellulose oligomer.

In the case of the aqueous dispersion, a concentration of the cellulose oligomer is not particularly limited, and may be, for example, 0.01 to 2% (w/v) or 0.5 to 1% (w/v). In the present specification, "% (w/v)" means a mass (g) of a target component contained in 100 mL of a solution.

A particle size of the cellulose oligomer in the aqueous dispersion of the cellulose oligomer is not particularly limited, but the particle size of the cellulose oligomer at a maximum intensity in measurement by a dynamic light scattering method (DLS) is preferably 10 µm or less, more preferably 5 µm or less, and may be 1.0 µm or less. A lower limit is not particularly limited, and may be 1 nm or more, 10 nm or more, or 100 nm or more.

The aqueous dispersion of the cellulose oligomer may contain sodium chloride. That is, the aqueous dispersion of the cellulose oligomer may be obtained by dispersing the cellulose oligomer in saline, and more specifically, may be obtained by dispersing the cellulose oligomer in physiological saline.

The medium additive may contain, for example, an additive such as methylated cellulose in addition to the above components.

2. Medium Composition

A medium composition according to a present embodiment is a medium composition capable of culturing cells in suspension, the medium composition containing a cellulose oligomer. As the cellulose oligomer, those indicated in the above section 1 can be used. That is, the medium composition according to the embodiment is obtained by adding the medium additive for suspension culture to a medium and mixing them.

As described above, the cellulose oligomer has an effect of retaining cells in a suspended state in a liquid medium, and thus the medium composition to which the cellulose oligomer is added is a liquid medium composition capable of culturing cells in suspension. In addition, the cellulose oligomer is dispersed in a state of being suspended in the medium, and, in that state, retains the cells in a suspended state. Unlike a hydrogel, the cellulose oligomer is not solidified to incorporate and retain the cells in the matrix. Therefore, it is considered that the cellulose oligomer does not limit the movement or growth of the cells (including spheroids which are cell aggregates), and thus cells having a more uniform size and a high circularity can be obtained.

The medium contained in the medium composition can be appropriately selected depending on the type of cells, and various liquid media can be used. Specific examples thereof include Dulbecco's modified Eagle medium (DMEM), Eagle's Minimum Essential medium (EMEM), αMEM medium (Minimum Essential Medium Eagle, Alpha Modification), Glasgow Minimum Essential Medium (GMEM), Ham's F12 medium (Nutrient Mixture F-12 Ham), DMEM/F12 medium (Dulbecco's modified Eagle Medium/Nutrient Mixture F-12 Ham), Iscove's Modified Dulbecco's Medium (IMDM), RPMI-1640 medium, and McCoy's 5A Medium.

The components contained in the medium are not particularly limited, and, for example, various components which are generally blended in a medium, such as amino acids, inorganic salts, glucose, and vitamins, can be blended.

The concentration of the cellulose oligomer in the medium composition is not particularly limited, but is preferably 0.01 to 2% (w/v), and more preferably 0.5 to 1% (w/v). When the concentration of the cellulose oligomer is 0.01% (w/v) or more, the dispersion stability of the cellulose oligomer in the medium composition can be improved to suspend cells, and when the concentration is 0.5% (w/v) or more, the effect can be further enhanced. In addition, when the concentration is 2% (w/v) or less, the medium composition can be easily handled as an aqueous dispersion when it is dispensed with a pipette or the like. When the concentration of the cellulose oligomer is low, the medium composition is sometimes separated into two layers of a transparent supernatant (upper layer) and a lower layer in which the cellulose oligomer is dispersed, in a relatively short period. However, even in this case, suspension culture can be similarly performed in the lower layer in which the cellulose oligomer is dispersed, and thus suspension culture may be performed in such a separated state.

A method for manufacturing the medium composition is not particularly limited. For example, when an aqueous dispersion of the cellulose oligomer is used, the aqueous dispersion and a liquid medium may be each sterilized in advance, and mixed together to uniformly disperse the cellulose oligomer in the medium composition. It is to be noted that cells may be added to and dispersed in a medium and then that the cell-dispersed medium may be mixed with an aqueous dispersion of the cellulose oligomer. In this case, at a stage when a medium composition is obtained, the cells are also contained in the medium composition. Alternatively, the medium composition may be prepared by mixing an aqueous dispersion of the cellulose oligomer with a liquid medium to uniformly disperse the cellulose oligomer in a medium composition, and then sterilizing the medium composition. The sterilization of the aqueous dispersion of the cellulose oligomer can also be regarded as a sterilization treatment by preparing the aqueous dispersion via an alkaline aqueous solution as in the Examples which will be described later, for example.

In the present embodiment, the cells are not particularly limited, and may be animal-derived cells or plant-derived cells. Examples of the animal-derived cells include germ cells, somatic cells, stem cells, progenitor cells, immortalized cells (cell lines), and genetically-modified cells, and cells collected or separated from a living body and, optionally, further artificially manipulated can be used. The stem cell is a cell having both self-proliferative ability and ability to differentiate, and examples thereof include embryonic stem cells (ES cells), somatic stem cells (for example, neural stem cells, hematopoietic stem cells, and skin stem cells), and induced pluripotent stem cells (iPS cells). The progenitor cells are cells in the middle of differentiation from a stem cell to a specific somatic cell or germ cell. The cell lines are cells that have acquired an infinite proliferative ability through artificial manipulation in vitro, and examples thereof include HeLa (cell line derived from human cervical cancer).

The medium composition according to the present embodiment is capable of culturing cells in suspension, that is, capable of suspension culture. Here, suspension culture refers to culture of cells in a state where the cells are suspended in a liquid medium without adhering to a culture vessel. In the present embodiment, it is preferable that cells can be cultured in suspension in a liquid medium composition without external pressure or vibration, stirring in the medium composition, or the like, i.e., even in a state where the medium composition is allowed to stand. Thus, it is preferable that the medium composition should be capable of standing suspension culture. A period during which the cells are suspended in a state in which the medium composition is allowed to stand, i.e., standing suspension is possible, is preferably 1 hour or longer, more preferably 24 hours or longer, and still more preferably 48 hours or longer.

A viscosity of the medium composition is not particularly limited, but the viscosity at 25° C. is preferably 5.00 mPa·s or less, and may be 3.00 mPa·s or less. Since a lower viscosity of the medium composition is more preferable, a lower limit of the viscosity is not particularly limited, and may be, for example, 0.50 mPa·s or more.

3. Culture Method

A cell culture method according to a present embodiment includes culturing cells in the medium composition. Specifically, the cells only need be mixed so as to be uniformly dispersed in the medium composition, and the resulting culture solution only need be cultured in a culture vessel. The culture vessel is not particularly limited, and examples thereof include a flask, a dish, a Petri dish, and a multi-well plate.

As a method for dispersing the cells in the medium composition, after preparation of a medium composition containing a cellulose oligomer, the cells may be added to and mixed with the medium composition. Alternatively, after the cells are added to and mixed with a medium, a cellulose oligomer may be added to and mixed with the medium.

In the culture, the culture solution may be allowed to stand, and, as necessary, the culture solution may be rotated, shaken, or stirred. Preferably, the culture solution is allowed to stand in order to reduce damage to the cell. In the present embodiment, by virtue of the cellulose oligomer dispersed in the culture solution, the cells are dispersed, with a three-dimensional spread, without being unevenly distributed only on a bottom surface of the culture solution, and can be subjected to standing suspension culture.

In one embodiment, the cells may be cultured to form spheroids which are three-dimensional cell aggregates (spherical cell polymers in which the cells are aggregated). A size of the spheroid is not particularly limited because it varies depending on the cell type and the culture period, and, for example, a diameter thereof may be 20 to 1000 μm, 40 μm to 500 μm, or 50 to 300 μm.

Conditions such as temperature and time for culture can be appropriately set according to the cells to be cultured. For example, in the case of animal cells, the culture temperature may be usually 25 to 39° C., and preferably 33 to 39° C. A $CO_2$ concentration may be usually 4 to 10 vol %, and is preferably 4 to 6 vol % in a culture atmosphere. The culture time is usually 3 to 35 days, but may be appropriately set according to the purpose of culture. In addition, in the case of plant cells, the culture temperature may be usually 20 to 30° C., and, if light is required, an illuminance condition may be set to an illuminance of 2000 to 8000 lux. In addition, the culture time is usually 3 to 70 days, but may be appropriately set according to the purpose of culture.

A cell concentration can also be appropriately set depending on the cells to be cultured, and is not particularly limited. For example, the cell concentration at the time of seeding (that is, a stage where the cells are seeded on the medium composition) may be $1.0 \times 10^3$ cells/mL to $1.0 \times 10^{10}$ cells/mL, or may be $1.0 \times 10^4$ cells/mL to $1.0 \times 10^8$ cells/mL.

In the culture, medium replacement may be performed. That is, the cell culture method according to the present embodiment may include steps of: culturing cells in the medium composition; and separating the cells obtained by the culture from a medium together with a cellulose oligomer; and mixing the separated cells and cellulose oligomer with a new medium to further culture the cells. As a method of separating the cells from the medium together with the cellulose oligomer, for example, the cells and the cellulose oligomer only need be settled by centrifugation, and the medium as the supernatant only need be removed. By adding a new medium to the separated cells and cellulose oligomer and mixing them, the cells and cellulose oligomer can be redispersed in the culture solution. Therefore, suspension culture can be performed without newly adding a cellulose oligomer, and the cellulose oligomer can be repeatedly used.

The culture method according to the present embodiment may further include a step of recovering the cultured cells. The recovery is a step of separating the cultured cells from the culture solution, and can be performed by, for example, filtration treatment. The cellulose oligomer is dispersed in the culture solution to retain the cells in a state of being dispersed, with a three-dimensional spread, in the culture solution, but the cellulose oligomer and the cells are not bound to each other. Therefore, the cellulose oligomer and the cells are easily separated from each other. In addition, the cellulose oligomer does not substantially increase the viscosity of the aqueous dispersion, and, thus, the medium composition and the culture solution also have a low viscosity. Therefore, filtration treatment by natural filtration can be performed, and damage to the cells can be reduced.

In one embodiment, the cultured cells (for example, spheroids) are larger than the cellulose oligomer. For example, the culture is preferably performed until the cells are larger than the cellulose oligomer. Since the cellulose oligomer is smaller than the cultured cells (spheroids) as described above, the cultured cells can be easily separated and recovered from the medium and the cellulose oligomer by filtration using a filter having a pore size larger than the particle size of the cellulose oligomer and smaller than that of the cultured cells.

EXAMPLES

Hereinafter, the present invention will be described in more detail with reference to Examples, but is not limited thereto.

1. Reagent

α-Glucose-1-phosphate (αG1P) disodium hydrate, DMEM, penicillin-streptomycin, and Dulbecco's phosphate buffer solution (DPBS) were purchased from FUJIFILM Wako Pure Chemical Corporation. Heavy water was purchased from Sigma-Aldrich. A 40 mass % sodium deuterium hydroxide heavy water solution was purchased from Cambridge Isotope Laboratories. Ultrapure water was supplied by a Milli-Q system (Milli-Q Advantage A-10, Merck Millipore). For the others, special or higher grade reagents were purchased from Nacalai Tesque and used.

2. Experimental Method (1) Synthesis of Cellulose Oligomer

According to the method described in T. Serizawa, et al., Polym. J., 2016, 48, 539-544 (using D-glucose as a primer), a cellulose oligomer (derived from glucose) having an average polymerization degree of 10 was synthesized. According to the method described in T. Serizawa, et al., Langmuir, 2017, 33, 13415-13422 (using cellobiose as a primer), a cellulose oligomer (derived from cellobiose) having an average polymerization degree of 7 was synthesized.

Specifically, 200 mM αG1P, 50 mM D-glucose or cellobiose, and 0.2 U/mL cellodextrin phosphorylase (CDP) were mixed in 500 mM 2-[4-(2-hydroxyethyl)-1-piperazinyl]ethanesulfonic acid (HEPES) buffer solution (pH 7.5) and incubated at 60° C. for 3 days. An operation of centrifuging the reaction solution containing the product (15000 rpm, 10 min or longer, 4° C.), removing the supernatant, then adding ultrapure water to redisperse the product, and centrifuging the dispersion (the same conditions) was repeated to purify the product until a substitution rate of the supernatant reached 99.999% or more, thereby obtaining a cellulose oligomer.

An average polymerization degree of the product was measured by a proton nuclear magnetic resonance (NMR) apparatus. A sample was prepared by dissolving 12 mg or more of the freeze-dried product in 600 μL of a 4 mass % sodium deuterium hydroxide heavy water solution. ADVANCE III HD 500 (Bruker Biospin, magnetic field strength: 500 MHz, number of integrations: 16 times) was used as the NMR apparatus. The average polymerization degree was calculated based on an integral value of protons at the anomeric position (δ~5.1, 4.5) of the reducing terminal of the cellulose oligomer and the other anomeric positions (δ~4.3).

(2) Preparation of Aqueous Dispersion of Cellulose Oligomer

A 1 N aqueous sodium hydroxide solution was added to and dispersed in a predetermined amount of the cellulose oligomer freeze-dried in a 1.5-mL tube. This dispersion was incubated at −20° C. for 20 minutes and then returned to room temperature to dissolve the cellulose oligomer, thereby preparing an aqueous cellulose/sodium hydroxide solution. 0.18 N Hydrochloric acid containing a phosphate buffer solution (pH 7.4) and the aqueous cellulose/sodium hydroxide solution were mixed so that a final concentration of sodium chloride was 137 mM and that a final concentration of the cellulose oligomer was 1% (w/v) and 2% (w/v) when the cellulose oligomer used was derived from glucose and cellobiose, respectively. The mixture was allowed to stand at 25° C. for one day. The reaction solution containing the product was centrifuged (15000 rpm, 10 min or longer, 25° C.), the supernatant was removed, sterilized purified water was then added to redisperse the product, and the dispersion was centrifuged (the same conditions). By repeating this operation, purification was performed until the substitution rate of the supernatant reached 99.999% or more, thereby obtaining an aqueous dispersion of the cellulose oligomer.

(3) Evaluation of Dispersion Stability of Cellulose Oligomer

The aqueous cellulose oligomer dispersion prepared in (2) was adjusted to 1% (w/v), and 250 μL of the resultant aqueous dispersion and 250 μL of ultrapure water or 2×DMEM (double concentration DMEM) were mixed in a 1-mL vial. The mixture was incubated at 37° C. for a predetermined time, and the dispersibility of the cellulose oligomer was visually observed over time. Furthermore, the dispersion incubated for three days was transferred to a 1.5-mL tube and centrifuged (15000 rpm, 5 min, 25° C.), and then 500 μL of ultrapure water or DMEM was added thereto to redisperse the cellulose oligomer in a 1-mL vial. This dispersion was incubated at 37° C. for a predetermined time, and the dispersibility was observed in the same manner.

(4) DLS Measurement of Cellulose Oligomer Dispersion

The aqueous cellulose oligomer dispersion prepared in (2) was adjusted to 0.005% (w/v), 80 μL of the resultant aqueous dispersion was added to a cell, and allowed to stand at 25° C. for 3 minutes, and then measurement was performed. In the measurement, a hydrodynamic diameter was calculated by cumulant analysis using Zetasizer Nano ZSP (Malvern) at a temperature of 25° C. and a scattering angle of 173° with Polystyrene Latex as a standard sample. DLS measurement was performed three times (n=3), and an average value thereof was obtained.

(5) Measurement of Viscosity of Medium Composition

The aqueous cellulose oligomer dispersion prepared in (2) was adjusted to 1% (w/v), and 1 mL of the resultant aqueous dispersion and 1 mL of 2×DMEM were mixed in a 2-mL vial. In addition, 1 mL of an aqueous 0.2% (w/v) cellulose nanofiber dispersion (RHEOCRYSTA, DKS Co. Ltd.) and 1 mL of 2×DMEM were mixed in a 2-mL tube. A viscosity of the thus-prepared medium composition was measured using a tuning fork vibration viscometer (SV-1A, A & D, 30 Hz) at a measurement temperature of 25° C.

(6) Cell Culture

HeLa cells (JCRB cell bank) were cultured in DMEM containing 10% FBS, 100 U/mL penicillin, and 100 μg/mL streptomycin under the conditions of 37° C. and 5% $CO_2$ in a 10-cm dish, and cultured to about 80% confluence for passage. The passage was carried out by the following operation: the medium was removed, and 10 mL of DPBS was added to the dish and stirred gently. DPBS was removed, and 1 mL of a 0.5 mg/mL trypsin solution was added, spread over the entire surface, and incubated under the conditions of 37° C. and 5% $CO_2$ for 5 minutes. DMEM (9 mL) was added to suspend the cells, 0.3 to 1 mL of the suspension was transferred to a new dish, DMEM was added to the suspension to attain a total volume of 10 mL, and gently stirred, and the cells were cultured under the conditions of 37° C. and 5% $CO_2$.

(7) Suspension Culture Using Cellulose Oligomer Dispersion

The cell suspension that was not used for the passage in (6) was transferred to a 15-mL tube and centrifuged (500 rpm, 3 min). An operation of removing the supernatant, then adding 10 mL of 2×DMEM to suspend the cells and centrifuging the suspension (the same conditions) was repeated three times. A solution obtained by mixing the cell suspension and a 0.4% Trypan blue solution at a ratio of 1:1 (by volume) was applied to a hemocytometer, the number of living cells was counted, and the solution was diluted with 2×DMEM to attain a cell concentration of $1.0 \times 10^5$ cells/mL. The cell suspension (50 μL) and the aqueous cellulose oligomer dispersion (50 μL) were mixed in a 96-well plate, and incubated under the conditions of 37° C. and 5% $CO_2$ for a predetermined time. As the aqueous cellulose oligomer dispersion, the dispersion prepared in (2) was adjusted to 1.0% (w/v) for use. Medium replacement was carried out every day by the following operation: the cell culture solution was transferred to a 1.5-mL tube, 1 mL of DMEM was added, and the mixture was centrifuged (200 g, 5 min, 25° C.). After removal of the supernatant, DMEM was added so as to attain a total amount of 100 μL to redisperse the cells, and the dispersion was transferred to a 96-well plate. The morphology of the cells was observed in a bright field mode of a fluorescence microscope (ZOE Fluorescent Cell Imager, Bio-rad). When an observation site was fixed, a mark was put on a bottom surface of the 96-well plate, and height of the microscope was fixed for the observation.

(8) Recovery of Cultured Cell

The cell culture solution after suspension culture for five days according to (7) was transferred to a 1.5-mL tube, and 1 mL of DPBS was added for dispersion. The dispersion was filtered through a nylon mesh filter (pore diameter: 40 μm, Funakoshi Co., Ltd.). The cells remaining on the filter were recovered in a 96-well plate by flowing 200 μL of DPBS from the opposite side of the filter, and the morphology of the cells was observed in the bright field mode of a fluorescence microscope (ZOE Fluorescent Cell Imager, Bio-rad).

3. Result and Consideration (1) Result of Evaluation of Dispersion Stability of Cellulose Oligomer Appearances when the cellulose oligomers were dispersed in ultrapure water and a serum medium (DMEM) and the dispersions were allowed to stand for a predetermined time are shown in FIG. 1. Although slight settling was observed when the dispersions were allowed to stand for three days, both the cellulose oligomers used were well dispersed in ultrapure water. In addition, the cellulose oligomers were well dispersed also in the serum medium, and it was found that the cellulose oligomers could be stably dispersed even in a solution in which various substances such as proteins and inorganic salts coexist. Furthermore, also when the cellulose oligomer dispersions allowed to stand for three days were centrifuged to redisperse the cellulose oligomers, and the dispersions were incubated again, the cellulose oligomers were well dispersed, and it was found that the dispersibility of the cellulose oligomers was maintained even after centrifugation and redispersion.

In FIG. 1, "Cel-derived (DMEM)" means a cellobiose-derived cellulose oligomer dispersed in a serum medium, and "Cel-derived (MilliQ)" means a cellobiose-derived cellulose oligomer dispersed in ultrapure water. In FIG. 1, "Glc-derived (DMEM)" means a glucose-derived cellulose oligomer dispersed in a serum medium, and "Glc-derived (MilliQ)" means a glucose-derived cellulose oligomer dispersed in ultrapure water.

(2) DLS Measurement Result of Cellulose Oligomer

Figure 2:
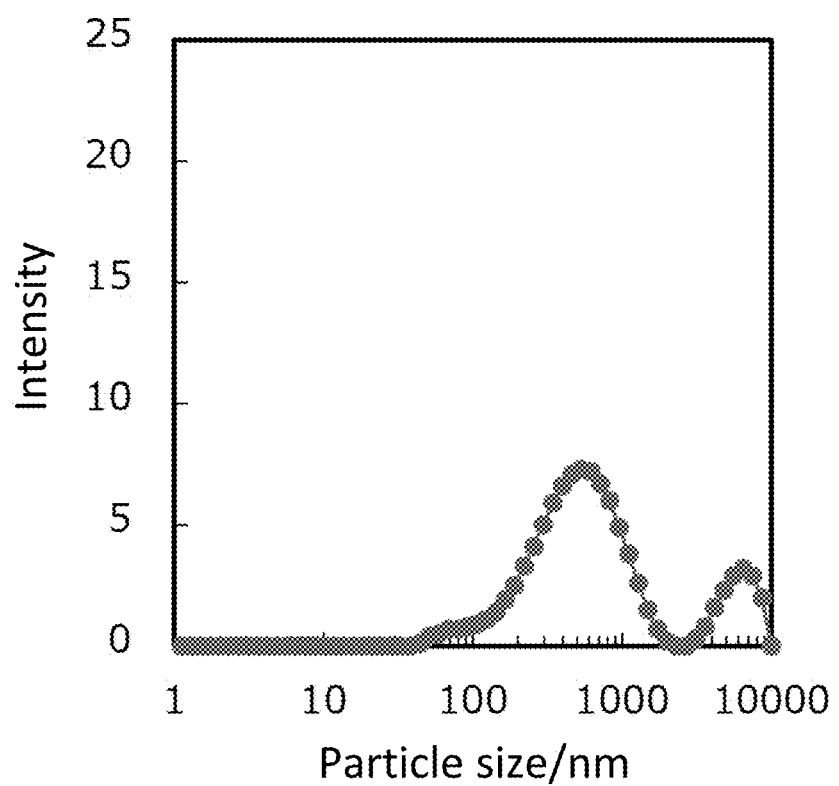
FIG. 2 A graph showing results of DLS measurement of the cellulose oligomer.

The results of DLS measurement of the cellulose oligomer dispersion (derived from cellobiose) are shown in FIG. 2. Two particle size peaks of 602 nm as a main component and 5719 nm as an accessory component were observed. The particle size at the maximum intensity was 602 nm. It was found that a cellulose aggregate produced by self-assembly through neutralization had a particle size of about sub μm to several μm.

(3) Measurement Result of Viscosity of Medium Composition

Viscosities of the solutions in which the cellulose oligomers were each dispersed in DMEM were measured. The medium compositions containing the glucose-derived cellulose oligomer and the cellobiose-derived cellulose oligomer, at a concentration of 0.5% (w/v), which were used for suspension culture, had viscosities of 1.64±0.2 mPa·s and 2.82±0.06 mPa·s, respectively. A medium composition containing 0.1% (w/v) of cellulose nanofibers, which were naturally-derived cellulose aggregates having a higher molecular weight, had a viscosity of 2.99±0.34 mPa·s. The medium compositions containing the cellulose oligomers each had a comparable or lower viscosity as compared with that of the medium composition containing cellulose nanofibers, despite their higher concentrations.

(4) Result of Suspension Culture

Figure 3:
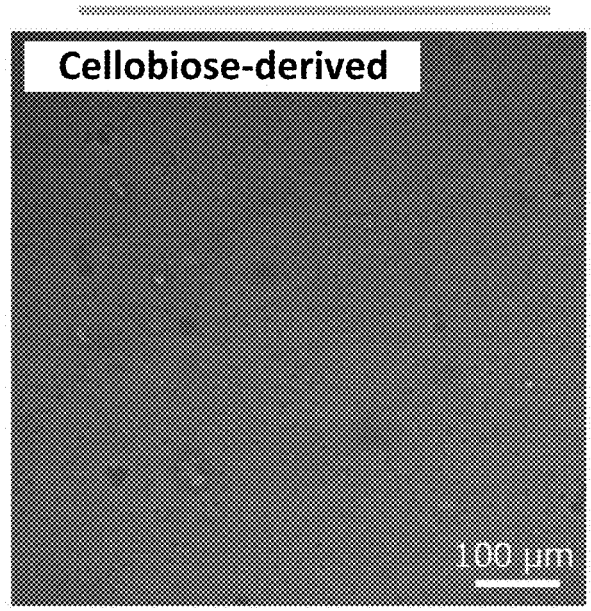
FIG. 3 A microscopic image of cells in a culture solution after suspension culture for one day.

FIG. 3 shows a microscopic image of the cells in the culture solution when the cells were cultured for one day using the cellobiose-derived cellulose oligomer. Since the cells were observed in the culture solution without settling even after one day, it was found that the cells could be three-dimensionally retained in the culture solution and cultured, by using the medium containing the cellulose oligomer.

Figure 4:
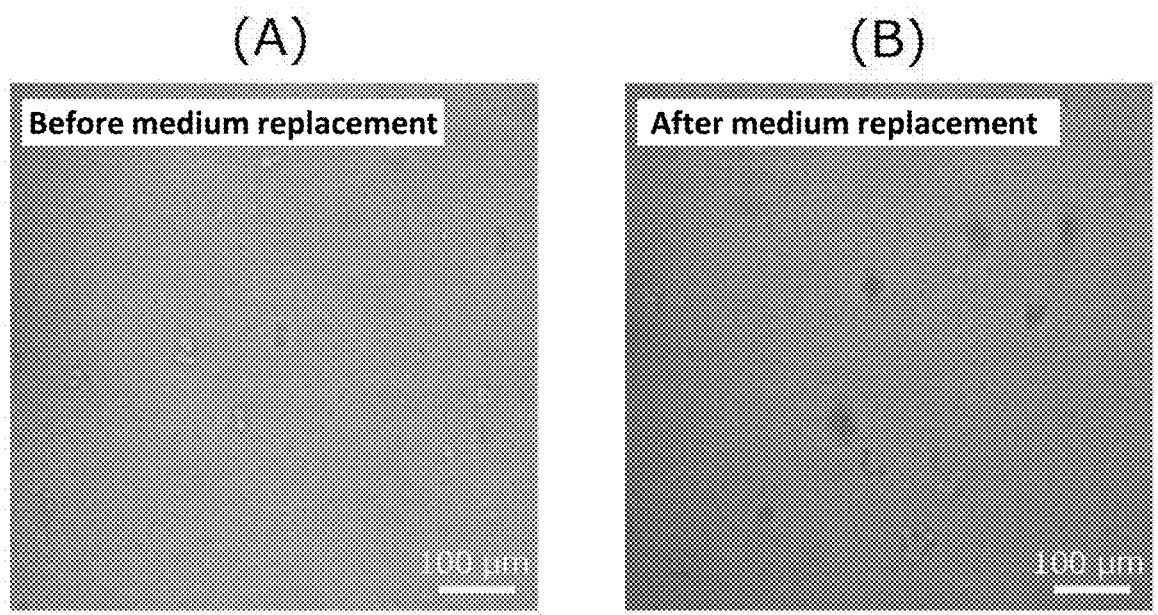
FIG. 4 Microscopic images of the cells in the culture solution, (A) before and (B) after medium replacement, after suspension culture for one day.

The cells were cultured for one day as described above, and then the medium was replaced by centrifugation and redispersion. FIG. 4 shows microscopic images of the cells in the culture solution before and after medium replacement. As a result, the cells were retained in the culture solution even after the medium replacement, and it was found that the medium could be replaced without newly adding the cellulose oligomer.

Figure 5:
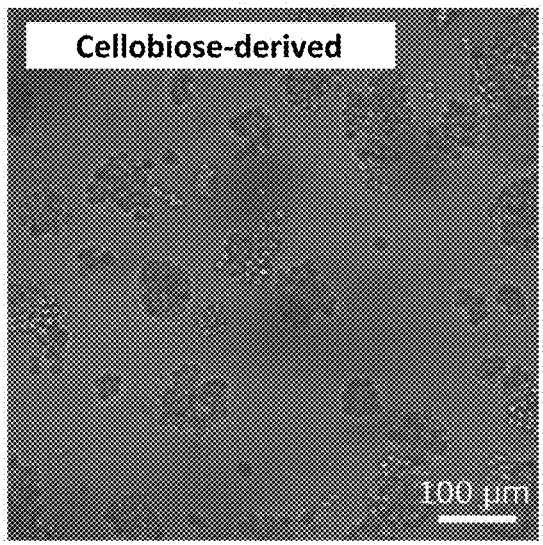
FIG. 5 Microscopic images of cells in culture solutions after suspension culture for five days (A) using a cellobiose-derived oligomer and (B) using a glucose-derived cellulose oligomer, respectively.
Figure 5:
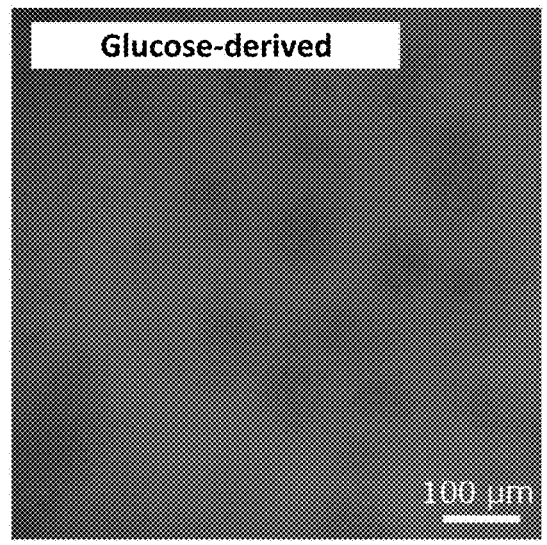

FIG. 5 shows microscopic images of the cells in the culture solutions when the cells were cultured for five days using the glucose-derived cellulose oligomer and the cellobiose-derived oligomer, respectively. From the observation that cells proliferated to form spheroids (aggregates of the cells) whichever cellulose oligomer dispersion was used, it was found that the cells proliferated in a suspended state.

Figure 6:
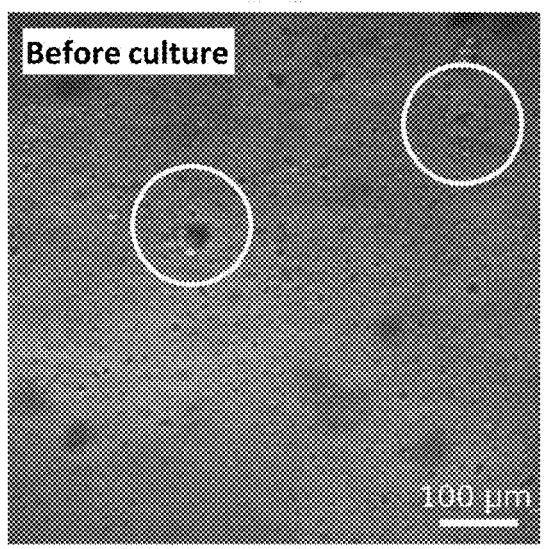
FIG. 6 Microscopic images of cells in a culture solution (A) before and (B) after culture, obtained by photographing the cells cultured without medium replacement for two days, with an observation site fixed.
Figure 6:
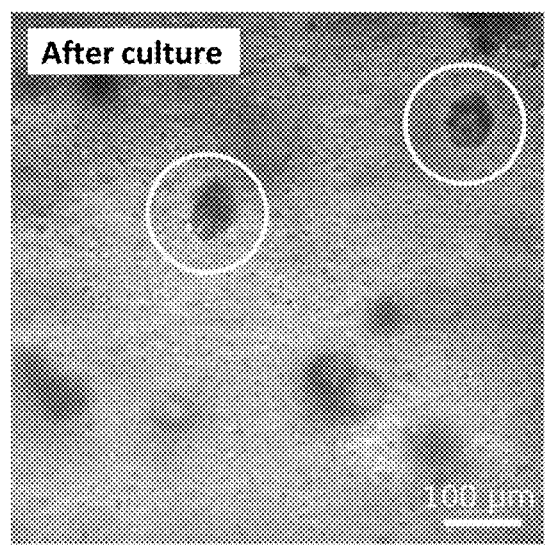

FIG. 6 shows microscopic images of the cells cultured for two days using the cellobiose-derived cellulose oligomer, obtained when observing the cells cultured, without medium replacement, for two days after medium replacement, with the observation site fixed before and after culture. Since aggregates of the cells were observed at the same sites before and after culture, it was found that the cells did not move in the culture process, were retained at the same positions, and proliferated to form spheroids.

From the above results, it became clear that the dispersions of the cellulose oligomers can be used for suspension culture of the cells.

(5) Result of Recovery of Cultured Cell

Figure 7:
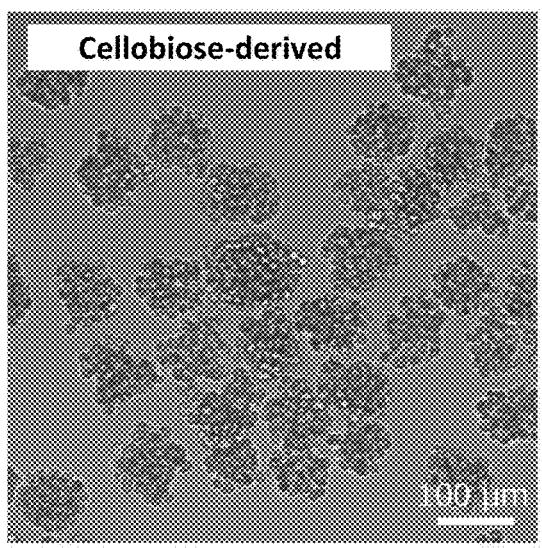
FIG. 7 Microscopic images of spheroids cultured (A) using the cellobiose-derived oligomer and (B) using the glucose-derived cellulose oligomer, respectively, and recovered.
Figure 7:
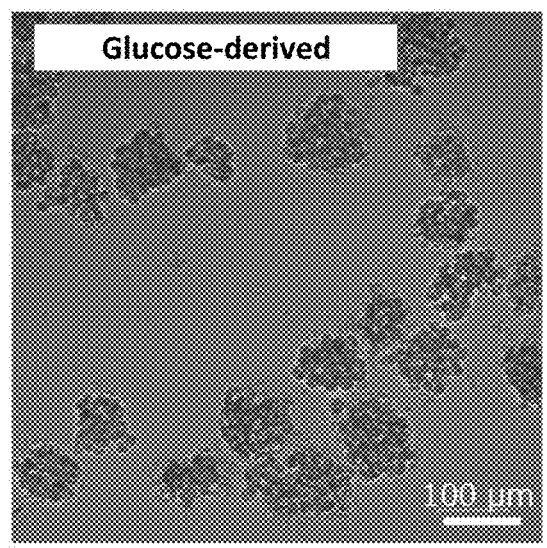

FIG. 7 shows microscopic images after recovery of the spheroids of the cultured HeLa cells. FIG. 7(A) shows a microscopic image of the spheroids using the cellobiose-derived cellulose oligomer, and FIG. 7(B) shows a microscopic image of the spheroids using the glucose-derived cellulose oligomer, the spheroids settling on the bottom surface of the plate after recovery. The dispersions after culture were diluted, and the spheroids were dispersed by pipetting, so that the dispersions could be naturally filtered. Therefore, the dispersions were filtered using a mesh filter having a pore size (40 μm) smaller than the cultured spheroids and larger than the cellulose oligomer aggregates, so that only the spheroids could be separated and recovered on the filter.

Some embodiments of the present invention have been described above. However, these embodiments are presented as examples and are not intended to limit the scope of the invention. These embodiments can be implemented in various other forms, and various omissions, replacements and modifications can be made without departing from the spirit of the invention. These embodiments and omissions, replacements, modifications and the like of the embodiments fall within the scope or spirit of the invention and also fall within the scope of the invention as defined by the appended claims and equivalents thereof.

The invention claimed is:

1. A cell culture method comprising: suspension culturing animal cells in a medium composition comprising a water-insoluble cellulose oligomer, wherein the cellulose oligomer is represented by the following general formula (1):

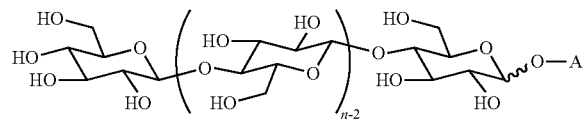

(1)

wherein A represents an alkyl group having 1 to 12 carbon atom(s), and n represents an average polymerization degree of 5 to 20, wherein said cellulose oligomer is present in an amount sufficient to retain said cells in a suspended state during said suspension culturing.

2. The cell culture method according to claim 1, wherein the animal cells are mammalian cells.

3. The cell culture method according to claim 1, wherein the animal cells are human cells.

4. The cell culture method according to claim 3, wherein the human cells are a human cell line.

5. The cell culture method according to claim 1, wherein said culturing comprises a period of time where said cells are suspended in a state in which the composition is allowed to stand and standing suspension occurs.

6. The cell culture method according to claim 5, wherein said period of time where said cells are suspended in a state in which the composition is allowed to stand and standing suspension occurs for 1 hour or longer.

7. The cell culture method according to claim 5, wherein said period of time where said cells are suspended in a state in which the composition is allowed to stand and standing suspension occurs for 24 hours or longer.

8. The cell culture method according to claim 5, wherein said period of time where said cells are suspended in a state in which the composition is allowed to stand and standing suspension occurs for 48 hours or longer.

9. The cell culture method according to claim 1, wherein a viscosity of the medium composition at 25° C. is 5.00 mPa·s or less.

10. The cell culture method according to claim 9, wherein a viscosity of the medium composition at 25° C. is 0.50 mPa·s or more.

11. The cell culture method according to claim 5, wherein, before said period of time, the cells are mixed with the culture medium to uniformly disperse the cells in the medium or said cells are mixed with a medium and the cellulose oligomer is added to and mixed with the medium.

12. The cell culture method according to claim 1, wherein said suspension culturing occurs in a culture vessel.

13. The cell culture method according to claim 12, wherein said suspension culturing occurs until spheroids are formed.

* * * * *